United States Patent [19]
Tomich
[11] 4,278,163
[45] Jul. 14, 1981

[54] WALL MOUNTED LOG CHUTE

[76] Inventor: Wayne K. Tomich, 6473 Lincoln St., Gagetown, Mich. 48735

[21] Appl. No.: 44,692

[22] Filed: Jun. 1, 1979

[51] Int. Cl.³ .............................................. B65G 11/16
[52] U.S. Cl. ...................................... 193/34; 232/43.4
[58] Field of Search ..................... 193/2 R, 17, 29, 30, 193/33, 34; 232/43.1, 43.4, 44, 43.3

[56] References Cited

U.S. PATENT DOCUMENTS

| | | | |
|---|---|---|---|
| 452,705 | 5/1891 | Harwood | 193/8 |
| 483,525 | 10/1892 | Becket | 232/43.4 |
| 752,848 | 2/1904 | Moffett et al. | 193/34 UX |
| 1,001,691 | 8/1911 | Rosen | 193/34 UX |
| 1,224,766 | 5/1917 | Martin et al. | 193/34 |
| 1,782,675 | 11/1930 | Bayley | 193/8 |
| 1,789,123 | 1/1931 | Triggs | 193/34 UX |
| 3,083,057 | 3/1963 | Kiser et al. | 298/7 |
| 3,348,733 | 10/1967 | Johnson | 221/298 |
| 4,136,762 | 1/1979 | Rosinbaum et al. | 193/34 |

FOREIGN PATENT DOCUMENTS

| | | | |
|---|---|---|---|
| 1396401 | 3/1964 | France | 193/34 |

*Primary Examiner*—Robert B. Reeves
*Assistant Examiner*—Gene A. Church
*Attorney, Agent, or Firm*—Basile, Weintraub & Hanlon

[57] ABSTRACT

A wall mounted log chute for transferring fireplace logs through a wall of a dwelling is disclosed. An opening formed in the wall of a dwelling has a hopper hinged thereto. The hopper is movable from a first position wherein the hopper is opened at the outside side of the wall to a second position wherein the hopper is opened at the inside side of the wall. An outer frame surrounds the opening at the outside wall, and an inside frame surrounds the opening at the inside wall. An outside wall of the hopper abuts the outside frame when the hopper is in the second position, and an inside wall of the hopper abuts the inside frame when the hopper is in the first position. Fireplace logs are insertable into the hopper when it is in the first position, and the logs are removed from the hopper for use in a fireplace within the dwelling when the hopper is in the second position.

7 Claims, 4 Drawing Figures

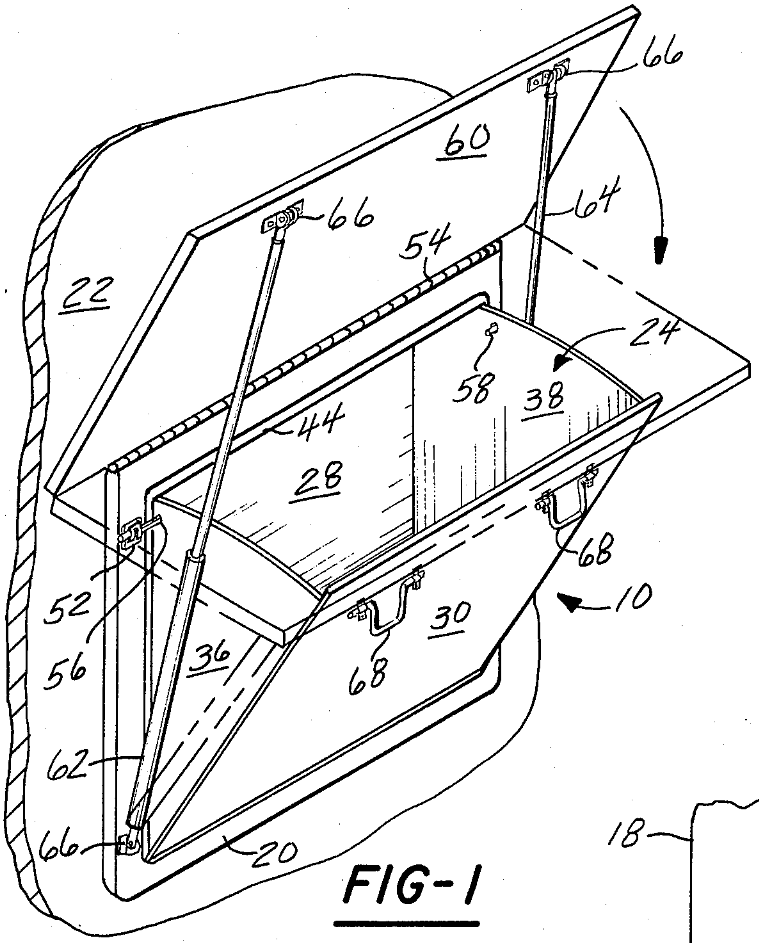
FIG-1
FIG-3
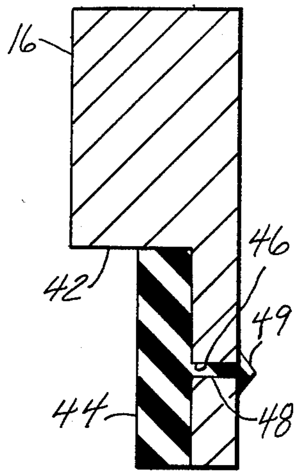
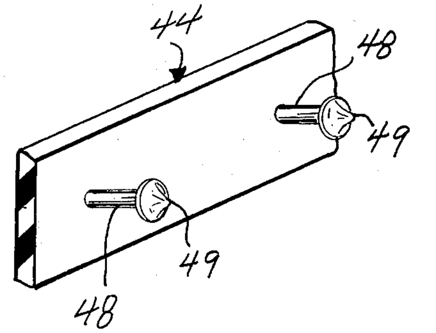
FIG-4
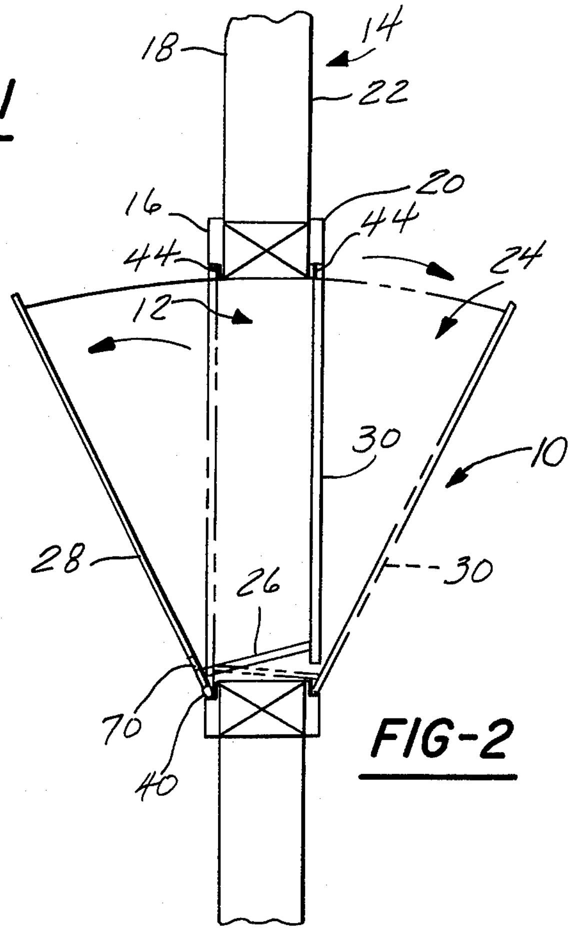
FIG-2

WALL MOUNTED LOG CHUTE

BACKGROUND OF THE INVENTION

I. Field of the Invention

The present invention relates to wall mounted chutes, more specifically the present invention relates to wall mounted log chutes mounted in the wall of a dwelling. Even more specifically the present invention relates to wall mounted log chutes having a hopper movable from a first position where the hopper is opened at the outside surface of the wall and closed at an inside surface of the wall, to a second position wherein the hopper is opened at the inside surface of the wall and closed at the outside surface.

II. Description of the Prior Art

A search of the issued United States Patents reveals the following inventions relating to chutes for passing materials through a wall.

U.S. Pat. No. 752,848 discloses an ore or grain chute with a lever operated gate for opening and closing an outer end of a hopper to control the flow of grain under gravity from the hopper to a receptacle beneath the chute. U.S. Pat. No. 1,001,691 discloses a bin for coal or other materials having a delivery chute which is provided with a sliding gate. The sliding gate controls the flow of coal or other articles from the bin to a receptacle located beneath the gate. U.S. Pat. No. 1,789,123 discloses a coal chute installation in an opening in a wall of a dwelling. A hopper is deployed from a first position wherein it projects outward from the building to facilitate the loading of coal into the chute, to a second position wherein the opening is closed and secured by means of an outer door. U.S. Pat. No. 1,782,675 discloses a chute for silos comprising a vertically slidable gate for opening the chute and allowing grain or other materials contained within the silo to be discharged. U.S. Pat. No. 3,083,057 discloses a truck mounted gravity grain box having a chute for discharging grain. A gate vertically slidable in tracks is opened by means of a lever operated mechanism to control the discharge of grain from the grain box to a container beneath the gate. U.S. Pat. No. 3,348,733 discloses a gravity powered article dispensing apparatus for vending machines having an electrically controlled article releasing device. U.S. Pat. No. 4,136,762 discloses a log dispenser for a fireplace comprising an opening in a building structure including a vertically sliding closure door operated by means of a bell crank. The logs are stored along a downward sloping ramp leading to the closure door, and when the door is opened gravity allows the logs to roll past the closure into a storage bin within the interior of the building.

All of the above listed United States patents employ gravity and/or a sliding gate or closure to control the movement of materials therepast. None of the above listed United States patents disclose a hinged hopper disposed in an opening in a dwelling, the hopper being movable from a first position wherein the hopper is opened to an outside surface of the wall with the inside wall of the hopper sealing against an inside frame of the chute, to a second position wherein the outside wall of the hopper seals against an outside frame of the chute and the hopper is opened at an inside portion of the wall.

SUMMARY OF THE INVENTION

The present invention comprises a wall mounted chute including a hopper hinged to the lower edge of an opening formed in a wall, the wall having an inside surface and an outside surface. The hopper is movable from the first position wherein the hopper is opened at the outside surface of the wall and closed at the inside surface, to a second position wherein the hopper is opened at the inside surface of the wall and closed at the outside surface. The chute further comprises an outer frame abutting the outer surface of the wall to finish the opening, and an inner frame abutting the inner surface of the wall to finish the inner edge of the opening. In a preferred embodiment the chute is hinged to the lower edge of the outer frame.

The hopper comprises an outer wall hinged along a lower edge to the outer frame. A bottom wall extending from the outer frame to the inner frame. The outer wall is complementary to the outer frame opening and integral with the outer edge of the bottom wall at the hinge. An inner wall of the hopper is complementary to the opening of the inner frame and integral with an inner edge of the bottom wall. An upper edge of the outer wall and an upper edge of the inner wall are spaced apart a distance wherein when the outer wall abuts the frame an opening exists between the inner frame and the upper edge of the inner wall. When the inner wall abuts the inner frame an opening exists between the outer frame and the upper edge of the outer wall. A pair of opposed side walls are integral with the inner and outer walls and the bottom wall forming an enclosure with an open top.

A gasket around the inner edge of the outer frame aids in sealing the outer wall of the hopper to the frame when the hopper is in the second position. A gasket around an inner edge of the inner frame aids in sealing the inner wall of the hopper against the inner frame when the hopper is in the first position.

It is apparent to the skilled artisan that when the hopper is in the first position logs can be loaded into the hopper while the opening is sealed against outside air entering the dwelling due to the inner wall of the hopper sealing against the gasket and the inner frame. It is also apparent to the skilled artisan that when the hopper is in the second position logs can be unloaded from the hopper without the intrusion of outside air into the dwelling due to the sealing of the outer wall of the hopper against the gasket and the outer frame.

For a more complete understanding of the present invention, reference is made to the following detailed description and accompanying drawing.

Other objects, advantages, and applications of the present invention will become apparent to those skilled in the field to which this invention pertains when the accompanying description of the best modes contemplated for practicing the invention are read in conjunction with the accompanying drawing.

BRIEF DESCRIPTION OF THE DRAWING

In the drawing, like reference numbers refer to like parts throughout the several views, and wherein:

FIG. 1 illustrates a perspective view of the preferred embodiment of the present invention as viewed from the inside of the dwelling;

FIG. 2 illustrates a cross-sectional view of the chute of the present invention taken vertically through the wall and chute with the hopper opened to the outside;

FIG. 3 illustrates a cross-sectional view of the frame and gasket of the present invention; and FIG. 4 illustrates a perspective view of the gasket employed in the present invention.

DESCRIPTION OF THE PREFERRED EMBODIMENT

Referring now to the drawing, and in particular to FIGS. 1–2 wherein there is illustrated at 10 a preferred embodiment of the present invention. In the present invention an opening 12 is formed in a wall 14 of the dwelling for mounting the chute 10 thereto. An outer frame 16 is mounted to an outside surface 18 of the wall and an inner frame 20 is affixed to an inside surface 22 of the wall 14. The outer frame 16 and the inner frame 20 serve to finish the opening and provide a means for mounting and sealing the chute 10 which will be described more fully hereinbelow.

A hopper 24 comprises a bottom wall 26 extending from the outer frame 16 to the inner frame 20. An outer wall 28 complementary to the outer frame opening extends upward from the bottom wall 26 and is integral with the bottom wall and hinged along a lower edge to the outer frame 16. An inner wall 30 complementary to the inner frame opening is integral with an inner edge of the bottom wall 26. An upper edge of the outer wall 28 and an upper edge of the inner wall 30 are spaced apart a distance wherein when the outer wall abuts the outer frame 16 an opening exists between the inner frame 20 and the upper edge of the inner wall 30. When the inner wall 30 abuts the inner frame 20 an opening exists between the upper edges of the outer wall 28 and the outer frame 16. A pair of opposed side walls 36,38 integral with the inner and outer walls 30,28 and the bottom wall 26 form an enclosure with an open top. In a preferred embodiment, the side walls and bottom wall join the inner and outer walls at a point spaced in a distance from the edges thereof to form a flange around the periphery of the inner and outer walls to aid in sealing the walls against their respective frames in a manner which will be described more fully hereinbelow.

A hinge 40 along a bottom edge of the outer wall 28 hinges the bottom wall to the outer frame 16 along a bottom edge of the frame opening. The hinge 40 and the shape of the hopper 24 cooperate to allow the hopper to be movable from a first position wherein the inner wall 30 abuts the frame 20 and the hopper 24 is opened at the outside surface 18 of the wall 14. The hopper 24 is movable to a second position wherein the outer wall 28 abuts the frame 16 and the hopper 24 is opened along an inside surface 22 of the wall 14. A recess 42 (FIG. 3) is formed around an inner periphery of the inner and outer frames, the recess being configured to nestingly receive the inner wall 28 and the outer wall 30. A pair of gaskets 44, abut the recess 42 around the periphery of the opening in the frames and provide a surface against which the outer wall 28 and the inner wall 30 can abut and seal. A plurality of openings 46 around the periphery of the recess 42 are aligned to receive a plurality of projections 48 along an inner face of each gasket 44. The projections include (FIG. 4) an enlarged end 49 which is compressable so that the end can be forced through the openings 46, returning to its enlarged state after passing therethrough to hold the gasket 44 in place.

Referring again to FIG. 1, a pair of slide bolts 52 are mounted to the inner frame 20 at the sides proximate the top. The bolts 52 are positioned to align with a pair of apertures 56,58 in the side walls 36,38 and when the bolts have entered the apertures 56,58 the hopper 24 is locked in the second position and entry by a burglar or moving of the chute to the first position by any unauthorized person is not permitted.

As shown in FIG. 1, a table or desk top 60 in a preferred embodiment, is hinged to an upper edge of the inner frame 20 by a hinge 54. A pair of telescoping supports 62,64 support the table top 60 in a first position wherein it is hinged away from the hopper opening, and in a second position wherein the table top 60 is horizontal and can be employed for writing or supporting ornamental objects. A friction means within the telescopic supports 62,64 enables the table top 60 to be positioned anywhere between the first and second positions.

Hinged fasteners 66 attach an upper end of the telescoping supports 62,64 to the table 60, and affix the lower end of the telescoping supports to the inner frame 20 allowing the table top 60 to be freely pivoted.

One or more handles 68 are affixed to the inner wall 30 by any suitable fastening means such as threaded fasteners. The handles 68 provide means for moving the hopper between the first position and the second position.

A plurality of openings 70, FIG. 2, pass through the outer wall 28 along an intersection of the outer wall 28 and the bottom wall 26 to drain any moisture which might accumulate therein to the outside.

Having thus described my invention what I claim is:

1. A wall mounted chute comprising:
   - an opening formed in a wall, the wall having an inside surface and an outside surface;
   - a hopper hinged to the wall including an inside wall, an outside wall, and a closed bottom wall integrally cojoined and having an enlarged open top for the entry and removal of articles through the top from either surface of the wall;
   - the hopper being movable from a first position where the hopper is open at the outside surface to a second position where the hopper is open at the inside surface and closed at the outside surface of the wall;
   - an outer frame abutting the outer wall finishing the opening;
   - an inner frame abutting the inner wall finishing the opening;
   - said hopper further comprising:
   - said bottom wall extending from the outer frame to the inner frame;
   - said outside wall complementary to the outer frame opening and integral with the bottom wall and hinged to the outer frame along a bottom edge thereof;
   - said inside wall complementary to the inner frame opening and integral with an inner edge of the bottom wall;
   - an upper edge of the outer wall and an upper edge of the inner wall being spaced apart a distance wherein when the hopper is in the second position an opening exists between the inner frame and an upper edge of the inner wall; and
   - a pair of opposed side walls integral with the inside and outside walls and the bottom wall forming an enclosure with an open top.

2. The wall mounted chute as defined in claim 1 further comprising:
   - the side walls and bottom wall joining the inner and outer walls at a point spaced in a distance from the edges thereof forming a flange;

a recess around an inner periphery of the inner and outer frames, the inner and outer walls nestingly received by the recess; and a gasket interposed between the inner and outer walls and their adjacent frames.

3. The wall mounted chute as defined in claim 1 further comprising:

one or more slidable bolts affixed to the inner frame; and one or more apertures in the side walls aligned with the bolts to slidingly receive the bolts.

4. The wall mounted chute as defined in claim 1 further comprising one or more handles affixed to the inner wall.

5. The wall mounted chute as defined in claim 1 further comprising:

a table top including an edge hinged to an upper edge of the inner frame;

a telescoping support pivotally affixed at a lower end to the inner frame and pivotally affixed at an upper end to the table top; and a friction means within the telescoping support to position the table between a first position wherein the table top is horizontal covering the chute opening, and a second position wherein the table top is hinged away from the chute opening uncovering the opening.

6. The wall mounted chute as defined in claim 1 further comprising a plurality of openings in the outer wall proximate the bottom wall to drain moisture from the chute.

7. The wall mounted chute as defined in claim 2 further comprising:

a plurality of openings in the recess of the inner and outer frames;

a plurality of projections along a face of the gasket aligned with the plurality of openings in the recess, the projections including an enlarged end which is compressable so as to be forced through the openings, said enlarged end returning to the enlarged state after passing through the opening to hold the gasket against the recess.

* * * * *